(12) United States Patent
Cornwall

(10) Patent No.: US 8,908,741 B2
(45) Date of Patent: *Dec. 9, 2014

(54) CLEAR-CHANNEL SYSTEM AND RELATED APPLICATIONS

(75) Inventor: Mark K. Cornwall, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/293,573

(22) Filed: Nov. 10, 2011

(65) Prior Publication Data

US 2012/0099620 A1 Apr. 26, 2012

Related U.S. Application Data

(63) Continuation of application No. 11/420,501, filed on May 26, 2006, now Pat. No. 8,243,773.

(51) Int. Cl.
H04B 1/00 (2006.01)
H04B 1/715 (2011.01)

(52) U.S. Cl.
CPC ........ *H04B 1/715* (2013.01); *H04B 2001/7154* (2013.01)
USPC .. 375/132; 375/130; 340/870.02; 340/870.03

(58) Field of Classification Search
USPC ................. 375/130, 132; 340/870.02, 370.03
See application file for complete search history.

(56) References Cited

U.S. PATENT DOCUMENTS

| 5,438,329 A | 8/1995 | Gastouniotis et al. |
| 5,719,564 A | 2/1998 | Sears |
| 5,883,886 A | 3/1999 | Eaton et al. |
| 6,018,543 A | 1/2000 | Blois et al. |
| 6,084,919 A | 7/2000 | Kleider et al. |
| 6,377,609 B1 | 4/2002 | Brennan, Jr. |
| 6,684,245 B1 | 1/2004 | Shuey et al. |
| 6,934,316 B2 | 8/2005 | Cornwall et al. |
| 6,967,974 B1 | 11/2005 | Partyka |

(Continued)

FOREIGN PATENT DOCUMENTS

| WO | WO 96/10300 | 4/1996 |
| WO | WO 01/52436 | 7/2001 |

OTHER PUBLICATIONS

European Search Report for EP Application No. 10182898.6, search completed Mar. 21, 2011

(Continued)

*Primary Examiner* — Leila Malek
(74) *Attorney, Agent, or Firm* — Hanley, Flight & Zimmerman, LLC

(57) ABSTRACT

A wireless spread-spectrum communication system for transmitting data includes a plurality of end point transmitters and at least one receiver. The end point transmitters transmit data via a frequency-hopped spread-spectrum signal where the transmitting signal is sent without the benefit of frequency stabilization. The receiver is responsive to the frequency-hopping spread-spectrum signals and includes a correlator and a signal processor. The correlator samples at least a first portion of a preamble of the signal and correlates the portion of the preamble with a known preamble pattern to determine a probability of correlation. The signal processor applies a Fast Fourier Transform algorithm to the signal in response to the probability of correlation to track a narrowband frequency of the signal based on at least a second portion of the preamble and to decode data encoded within the signal subsequent to the preamble.

10 Claims, 4 Drawing Sheets

(56) References Cited

U.S. PATENT DOCUMENTS

| | | | |
|---|---|---|---|
| 6,996,215 | B2 | 2/2006 | MacConnell |
| 8,243,773 | B2 | 8/2012 | Cornwall |
| 2002/0070803 | A1* | 6/2002 | Rzyski .................. 330/149 |
| 2002/0109607 | A1* | 8/2002 | Cumeralto et al. ...... 340/870.02 |
| 2004/0047324 | A1* | 3/2004 | Diener .................. 370/338 |
| 2004/0210544 | A1 | 10/2004 | Shuey et al. |
| 2004/0263352 | A1 | 12/2004 | Cornwall et al. |
| 2005/0002473 | A1 | 1/2005 | Kloper et al. |
| 2005/0055432 | A1 | 3/2005 | Rodgers |
| 2005/0078631 | A1 | 4/2005 | Cornwall |
| 2005/0111492 | A1 | 5/2005 | Kang et al. |
| 2005/0270173 | A1 | 12/2005 | Boaz |
| 2013/0051431 | A1 | 2/2013 | Cornwall |

OTHER PUBLICATIONS

European Patent Office, Extended European Search Report issued in European Application No. 07794744.8, dated May 29, 2013, 6 pages.

The United States Patent and Trademark Office, Office action issued in U.S. Appl. No. 13/660,081 dated Jun. 17, 2013, 17 pages.

The United States Patent and Trademark Office, "Office Action," issued in connection with U.S. Appl. No. 13/660,081, dated Oct. 22, 2013, 18 pages.

European Patent Office, "Communication pursuant to Article 94(3) EPC," issued in connection with European Patent Application No. 07794744.8, May 9, 2014, 3 pages.

United States Patent and Trademark Office, "Final Office Action," issued in connection with U.S. Appl. No. 13/660,081, mailed on Apr. 10, 2014, 23 pages.

Canadian Intellectual Property Office, "First Office Action," issued in connection with Canadian Patent Application No. 2,652,577, issued May 30, 2014, 3 pages.

United States Patent and Trademark Office, "Advisory Action," issued in connection with U.S. Appl. No. 13/660,081, mailed on Sep. 19, 2013, 3 pages.

United States Patent and Trademark Office, "Non-Final Office Action," issued in connection with U.S. Appl. No. 13/660,081, mailed on Jan. 31, 2013, 23 pages.

* cited by examiner

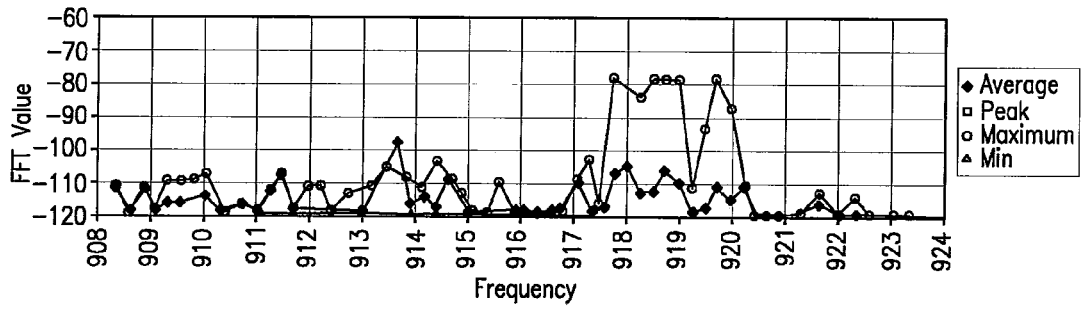
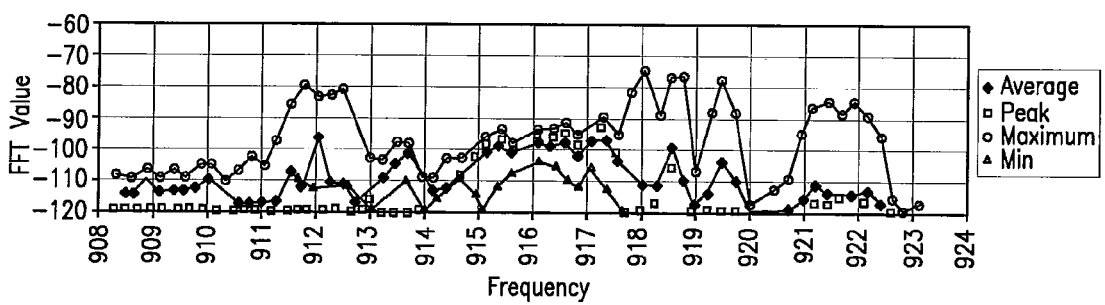
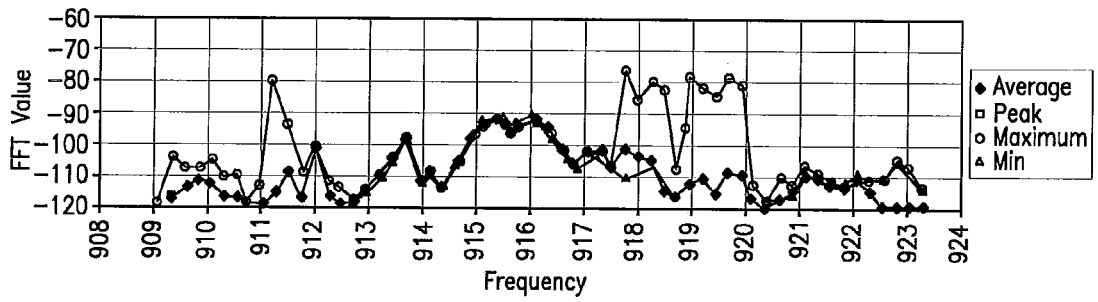

CLEAR-CHANNEL SYSTEM AND RELATED APPLICATIONS

PRIORITY CLAIM

This application is a continuation of prior pending U.S. patent application Ser. No. 11/420,501. May, 26, 2006, entitled "CLEAR-CHANNEL SYSTEM AND RELATED APPLICATIONS" which is hereby incorporated herein by reference in its Entirety for all purposes. Any disclaimer that may have occurred during prosecution of The above-referenced application is hereby expressly rescinded.

FIELD OF THE INVENTION

The present invention relates to frequency-hopping spread-spectrum radio systems and, more particularly, to a spread-spectrum radio system that enhances system communications in a given location.

BACKGROUND OF THE INVENTION

Wireless automatic meter reading systems are well known. Typically, each utility meter is provided with a battery-powered encoder that collects meter readings and periodically transmits those readings over a wireless network to a central station. The power limitations imposed by the need for the encoder to be battery-powered and by regulations governing radio transmissions effectively prevent direct radio transmissions to the central station. Instead, wireless meter-reading systems typically employ a layered network of overlapping intermediate receiving stations that receive transmissions from a group of meter encoders and forward those messages to the next-higher layer in the network as described, for example, in U.S. Pat. No. 5,056,107. These types of layered wireless-transmission networks allow for the use of lower power, unlicensed wireless transmitters for the potentially thousands of end-point encoder transmitters that must be deployed as part of a utility-meter-reading system for a large metropolitan area.

In 1985, as an attempt to stimulate the production and use of wireless-network products, the FCC modified Part 15 of the radio spectrum regulation, which governs unlicensed devices. The modification authorized wireless-network products to operate in the industrial, scientific, and medical (ISM) bands using spread-spectrum modulation. The ISM frequencies that may be used include 902 to 928 MHz, 2.4 to 2.4835 GHz, and 5.725 to 5.850 GHz. The FCC allows users to operate spread-spectrum wireless products, such as utility-metering systems, without obtaining FCC licenses if the products meet certain requirements. This deregulation of the frequency spectrum eliminates the need for the user organizations to perform costly and time-consuming frequency-planning to coordinate radio installations that avoid interference with existing radio systems.

Spread-spectrum modulators use one of two methods to spread the signal over a wider area. The first method is that of direct-sequence spread-spectrum (DSSS) while the second is frequency-hopping spread-spectrum (FHSS). DSSS combines a data signal at the sending station with a higher data-rate bit sequence, sometimes called a "chipping code" or "processing gain." A high processing gain increases the signal's resistance to interference. FHSS, on the other hand, relies on the distribution of a data signal randomly hopped across a number of defined-frequency channels to avoid interference.

FHSS operates by taking the data signal and modulating it with a carrier signal that hops from frequency to frequency as a function of time over a wide band of frequencies. With FHSS, the carrier frequency changes periodically. The frequency-hopping technique reduces interference because an interfering signal from a narrowband system will only affect the spread-spectrum signal if both are transmitting at the same frequency and at the same time. Thus, the aggregate interference will be very low, resulting in little or no bit errors.

In the frequency-hopping systems described above, interference in the ISM band from various sources, such as geographical obstructions, unlicensed radios, portable phones, and the like, decrease the probability that transmissions will be received. If transmissions could be directed to clear channels and away from noisy ones, the probability of successful reception would be increased, thereby enhancing system efficiency.

SUMMARY OF THE INVENTION

A wireless spread-spectrum communication system for transmitting data in an ISM band system enhanced by the detection and use of clear channels in the band. The system includes a radio with a transmitter, receiver, and a microprocessor. The system further includes two-way endpoints, repeaters and one-way endpoints, or any combination of endpoints and repeaters. In an embodiment of the invention, a radio with a receiver capable of measuring power levels in frequency bins for a location is used to create a localized band profile. The band profile identifies noisy and clear channels. The radio employs a transmitter to send the band profile to two-way endpoints nearby. In another embodiment, the radio transmits the band profile to a repeater, which receives FHSS signals from nearby endpoints and then forwards them to the radio using the optimized band profile. In these embodiments, the band profile is generated by the radio's microprocessor, which compares the band snapshots for a location over time. In another embodiment, the radio continues to measure power levels in frequency bins for the location after the band profile has been generated. When a second band profile is derived that deviates beyond predetermined thresholds from the first band profile, the radio transmits the second band profile to recipients of the first band profile. The recipient endpoints or repeaters use the second band profile to replace the first and adjust their transmissions to the radio accordingly. In an embodiment, the endpoint or repeater stores a band profile in the form of a lookup table. The radio may also transmit band profiles in the form of lookup tables.

BRIEF DESCRIPTION OF THE DRAWINGS

FIGS. 4A, 4B, and 4C show snapshots of a shared band for a location taken at different times of day.

DETAILED DESCRIPTION OF PREFERRED EMBODIMENTS

Figure 1:
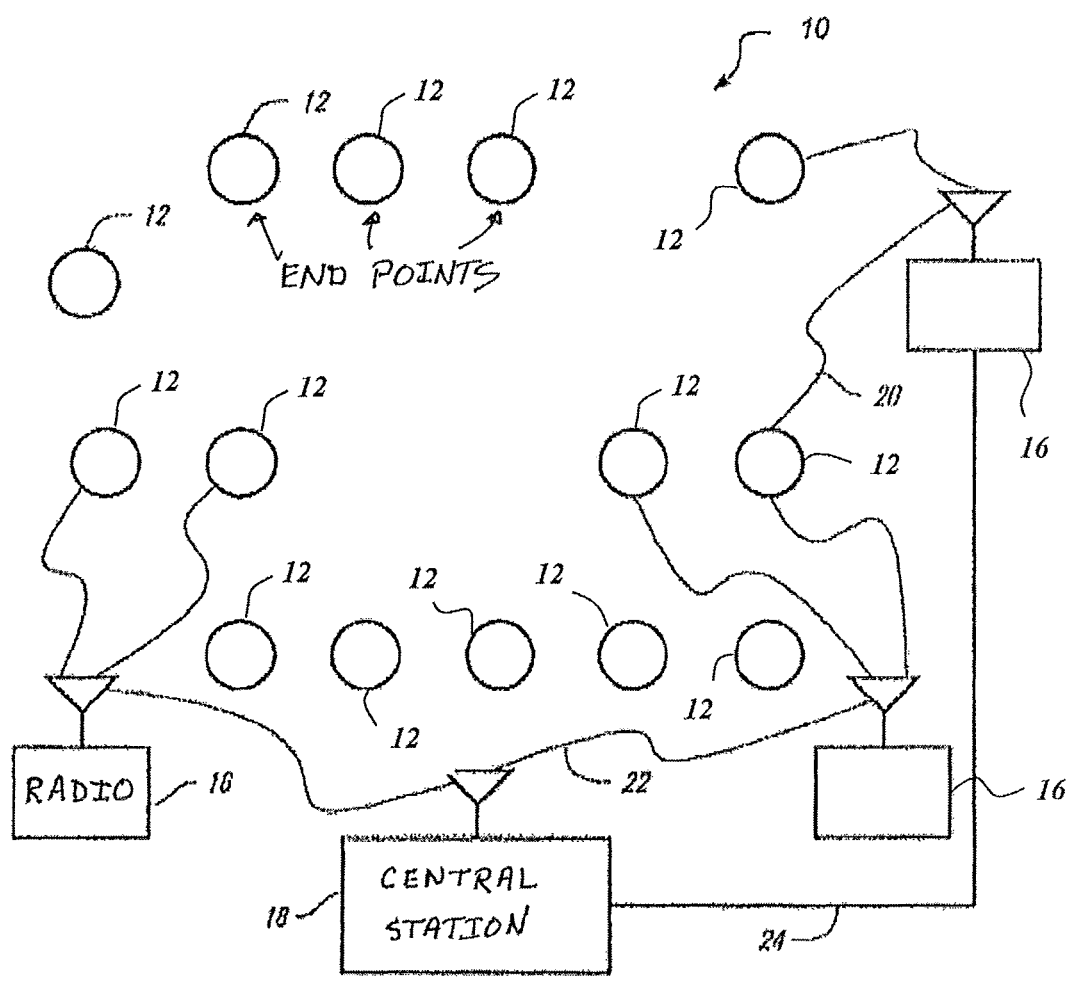
FIG. 1 is an overall schematic diagram of a frequency-hopping spread-spectrum (FHSS).

In conjunction with the detailed description below, this application incorporates by reference commonly assigned U.S. Provisional Application No. 60/500,507, filed on Sep. 5, 2003, entitled, "SYSTEM AND METHOD FOR DETEC- TION OF SPECIFIC ON-AIR DATA RATE," U.S. Provisional Application No. 60/500,515, filed Sep. 5, 2003, entitled, "SYSTEM AND METHOD FOR MOBILE DEMAND RESET," U.S. Provisional Application No. 60/500,504, filed Sep. 5, 2003, entitled, "SYSTEM AND METHOD FOR OPTIMIZING CONTIGUOUS CHANNEL OPERATION WITH CELLULAR REUSE," U.S. Provisional Application No. 60/500,479, filed Sep. 5, 2003, entitled, "SYNCHRONOUS DATA RECOVERY SYSTEM," U.S. Provisional Application No. 60/500,550, filed Sep. 5, 2003, entitled, "DATA COMMUNICATION PROTOCOL IN AN AUTOMATIC METER READING SYSTEM," U.S. patent application Ser. No. 10/655,760, filed on Sep. 5, 2003, entitled, "SYNCHRONIZING AND CONTROLLING SOFTWARE DOWNLOADS, SUCH AS FOR COMPONENTS OF A UTILITY METER-READING SYSTEM," U.S. patent application Ser. No. 10/655,759, filed on Sep. 5, 2003, entitled, "FIELD DATA COLLECTION AND PROCESSING SYSTEM, SUCH AS FOR ELECTRIC, GAS, AND WATER UTILITY DATA," U.S. Provisional Patent Application No. 60/222,256, filed on Aug. 1, 2000, entitled, "FREQUENCY HOPPING SPREAD SPECTRUM SYSTEM WITH HIGH SENSITIVITY TRACKING AND SYNCHRONIZATION FOR FREQUENCY UNSTABLE SIGNALS," U.S. patent application Ser. No. 11/222,657, filed on Sep. 9, 2005, entitled "METER READING SYSTEM," and U.S. Patent Application No. 60/500,506, filed on Sep. 5, 2003, entitled "OPTIMIZED BUBLLE UP RECEIVER."

FHSS system 10 includes a multitude of end point transmitters 12 and at least one radio 16 with a receiver. In a preferred embodiment, end point transmitters 12 are battery-operated encoder transmitters operably connected to a utility meter. In this embodiment, it is expected that up to hundreds of thousands of end point transmitters 12 will be deployed as part of a FHSS system 10 in a metropolitan area. Alternatively, end point transmitters 12 can be low-power sensors, detectors or other data encoders that transmit encoded data using FHSS signal 20. Preferably, end-point transmitters 12 are deployed at a multitude of fixed locations over an entire coverage zone. End-point transmitters 12 could also be mobile transmitters operating within one or more coverage zones, such as pagers or portable transponders.

In an embodiment, radios 16 comprise a plurality of fixed intermediate radios 16 arranged in a hierarchical network of overlapping zones of coverage that receive encoded data from end point transmitters 12, 13 and forward the data by retransmission to a central station 18. Reference is made to the previously-identified co-pending application entitled "Spread Spectrum Meter Reading System Utilizing Low-Speed/High Power Frequency Hopping" for a more detailed description of a network of fixed intermediate radios 16 and a central station 20, the disclosure of which is hereby incorporated by reference. The radios 16 may be designed as half-duplex radios (transmit or receive but not both simultaneously); however, this architecture has been shown to have some limitations. Preferably, the radios 16 are implemented as a full-duplex design (transmit and receive simultaneously).

In one embodiment, the radios 16 are capable of wireless retransmission of data 22 to the central station 18. Alternatively, the radios 16 can store data until it is manually or automatically downloaded to the central station 18, or the radios may be equipped with other communication channels 24, such as telephone lines, power lines, satellite, cellular phone or the like to transmit immediately or in a store and forward mode data received from the end point transmitters 12, either individually or combined into larger blocks or summarized over time for the purpose of creating a metered function associated with one or more end point transmitters 12.

It will be understood that the end point transmitters 12 may be of the bubble-up variety wherein encoded data is automatically periodically transmitted by the transmitter 12 (either according to a predefined timing pattern or pseudo-randomly), or the transmitters 12 may be polled or interrogated to respond to a wakeup tone, for example, transmitted by fixed radio 16 and then transmit FHSS signals 20 with encoded data in response to the polling or interrogation signal.

Figure 2:
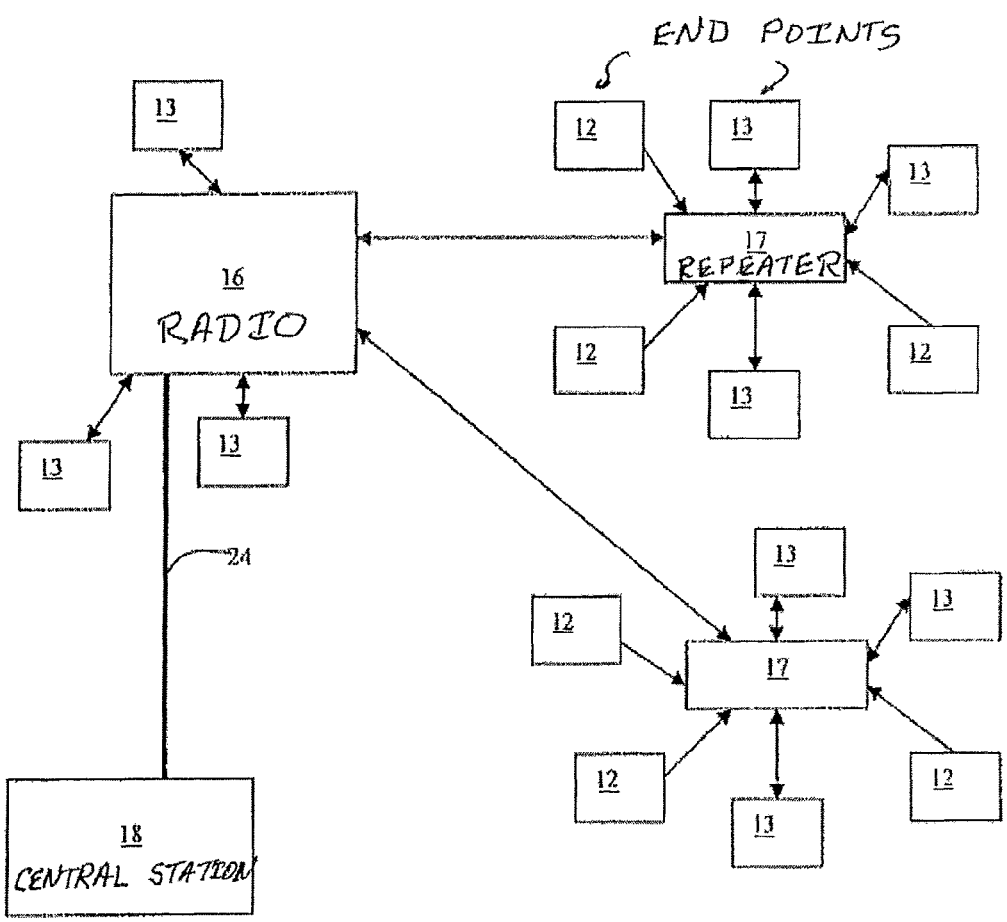
FIG. 2 is a diagram of one embodiment of an encoded FHSS packet.

System 10 can employ both one-way ("bubble-up") endpoints and two-way endpoints. Two-way repeaters can also be added to the system as shown in FIG. 2. The one-way endpoints are ERT endpoints described above. Two-way endpoints may be of the type disclosed in U.S. patent application Ser. No. 11/222,657, filed on Sep. 9, 2005, entitled "METER READING SYSTEM".

Figure 3:
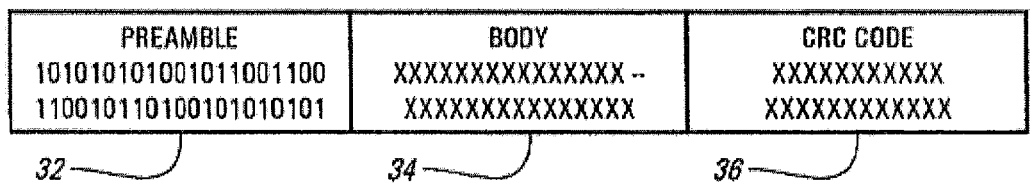
FIG. 3 is a schematic diagram of an FHSS system using repeaters, one-way endpoints, and two-way endpoints.

In a preferred embodiment as shown in FIG. 3, FHSS signals 20 are sent as encoded packets of data 30 transmitted as a frequency-hopping spread-spectrum signal in the band between 910-920 MHz. Thus, system 10 uses unlicensed frequency-hopping spread-spectrum transmitters operating in accordance with FCC Part 15.249 (transmitter power less than 500 mW) or Part 15.247 (transmitter power less than 5 W). For purposes of the present invention, transmitters 12 operating under either of these regulations are considered to be low-powered transmitters. Preferably, the encoded packets 30 are sent in accordance with a predefined protocol. One such protocol is the ERT protocol for meter encoder transmitters manufactured by Itron, Inc., the assignee of the present invention. Another such protocol is the PET protocol as defined in the previously-identified co-pending application entitled "Spread Spectrum Meter Reading System Utilizing Low-Speed/High Power Frequency Hopping." In a preferred embodiment, the encoded data of the packet 30 is on-off keyed (OOK) modulated. Other amplitude modulation (AM) techniques may also be used. It is also possible for the encoded data to be modulated using other modulation techniques, such as frequency modulation (FM) or frequency shift key (fsk) modulation, although additional circuitry may be required to implement these techniques as will be appreciated by a person of ordinary skill in the art.

The receiver of radios 16 is preferably a low cost, low power, receiver that is capable of identifying, locating, and tracking FHSS signals received from a transmitter such as that disclosed in U.S. patent application Ser. No. 11/209,348, Filed on Aug. 22, 2005, entitled, "FREQUENCY HOPPING SPREAD SPECTRUM SYSTEM WITH HIGH SENSITIVITY TRACKING AND SYNCHRONIZATION FOR FREQUENCY UNSTABLE SIGNALS" although other receivers may also be used.

Radio 16 examines the entire useful portion of the wideband at once, looking for a signal suggestive of a data packet transmitted by an endpoint 12, 13 or repeater 17. Once a data packet is detected, radio 16 employs a Fast Fourier Transform (FFT) to determine the narrowband frequency on which the data packet is being transmitted. Thus, radio 16 has the ability to take a "snapshot" of the ISM band and measure the signal level across the band. The snapshot includes a measurement of power levels in frequency bins or channels of the FFT. By collecting a series of snapshots over time, the receiver's microprocessor constructs a profile of peak and average power over time and thereby derives a profile of the band. The band profile may be localized because radio 16 receives transmissions from nearby endpoints 13 and repeaters 17. The band profile may include localized information about generally clear channels, generally noisy channels, and channels with noise levels that vary over time.

Once generated, the band profile is transmitted in a two-way system to an endpoint 13 or repeater 17, as shown in FIG. 2. Endpoint 13 or repeater 17 then adjusts its transmissions to avoid channels identified as noisy in the profile.

Endpoint 13 or repeater 17 stores a band profile in a useable form, such as a lookup table. The endpoint 13 or repeater 17 uses the band profile until an updated band profile or an entirely new band profile is received.

System 10 can also be used to enhance transmissions in other shared bands, such as the international 433 band.

Band profiles can be created for a particular locations in a variety of ways. For example, comparison of snapshots taken of a band in a particular location at different times of the day will generate a time-dependent band profile. FIG. 4A shows a spectrum at the middle of the day at a specific location. The interference is greatest between 916 MHz and 920 MHz, with interference also appearing around 913.5 MHz. FIG. 4B shows the same location in the evening. Interference has increased in the middle of the band and there is pronounced interference at 912 MHz and 921.5 MHz, such as would be caused by portable phones using digital modulation. The spectrum below 911 MHz and a notch between 920 MHz and 921 MHz remain relatively clear. FIG. 4C shows the location in the morning. The spectrum below 911 MHz and above 920 MHz remains clear.

Other aspects of a band's profile remain relatively constant over time. Geographical obstructions, for example, may make some channels in a particular location undesirable at any time of day. Thus, a band profile may contain both time-dependent information about the band and information about the band that is generally true throughout the day.

By transmitting band profiles to two-way endpoints 13 or repeaters 17, radio 16 provides information that endpoints 13 or repeaters 17 can use to avoid noisy channels and find relatively clear channels of the shared band.

In use, system 10 provides for band profiles generated by the receiver to be transmitted and employed by endpoints and repeaters. To begin with, radio 16 transmits a band profile to the endpoints, the repeaters, or both. Endpoints 13 and repeaters 17 store the band profile in a usable format, such as a lookup table. Transmissions by endpoints 13 and repeaters 17 are then directed to avoid the noisy channels and to favor the clear channels Preferably, radio 16 continues to monitor the relevant shared band for changes in the band profile by taking repeated snapshots of the band over time. From these snapshots, peaks and averages may be calculated. When variances in the band profile reach a predetermined threshold, the radio sends updated information about the band profile to endpoints 13 and repeaters 17. Once received, the updated band information is used to adjust the transmission pattern of the endpoint or repeater, for example, by updating the lookup table.

In system 10, repeaters 17 may be used to relay band profiles to endpoints. This ensures that endpoints have access to band profiles and band-profile updates.

Although the present invention has been described with respect to the preferred embodiment, it will be understood that numerous changes and variations to aspects of the invention can be made and that the scope of the present invention is intended to be consistent with the claims as follows:

What is claimed is:

1. A frequency-hopping spread-spectrum (FHSS) system for enhancing communications in a given location, the system comprising:

a radio in communication with an endpoint, the endpoint coupled to a utility meter, the radio comprising:
a receiver to receive data in a frequency band;
a microprocessor to analyze the received data to create a band profile of power levels at frequencies across the frequency band; and
a transmitter to transmit the band profile to the endpoint to facilitate communication from the endpoint by the endpoint avoiding noisy channels identified from the band profile,
wherein the receiver receives utility consumption data from the endpoint via FHSS signals transmitted over channels associated with the band profile, and the transmitter transmits the utility consumption data to a utility data collector to be ultimately provided to a central station.

2. The system of claim 1, wherein the band profile comprises a lookup table.

3. The system of claim 1, wherein the band profile identifies channels corresponding to times-of-day, the band profile received from the radio to facilitate communication to the radio at a first time-of-day over channels corresponding to the first time-of-day.

4. A data transmission system, comprising:
a frequency-hopping spread-spectrum (FHSS) transmitter configured to transmit signals to a radio on predetermined channels within a predetermined frequency band, the radio to transmit a time-of-day dependent band profile of signal levels;
a utility meter coupled to the FHSS transmitter; and
a receiver configured to receive from the radio the time-of-day dependent band profile of signal levels on the predetermined channels over a predetermined time period, and to identify noisy channels within the predetermined channels based on the band profile,
wherein the FHSS transmitter is configured to transmit utility consumption data provided by the utility meter to the radio on channels other than the identified noisy channels, the utility consumption data to be ultimately retransmitted by the radio to a central station.

5. The system of claim 4, wherein the band profile identifies relatively clear channels within the predetermined channels to enable the FHSS transmitter to adjust its transmission of signals to transmit signals on the relatively clear channels.

6. The system of claim 4, further comprising a data-storage device configured to store the band profile as a table accessible to the FHSS transmitter.

7. The system of claim 4, wherein the band profile is updated based on further signal levels received by the radio on the predetermined channels during further series of measurements.

8. The system of claim 4, wherein the predetermined frequency band corresponds to one of the industrial, scientific, and medical (ISM) bands.

9. The system of claim 4, wherein the band profile comprises peak and average power over time for frequencies of the band.

10. The system of claim 4, wherein the band profile identifies noisy channels corresponding to times-of-day, the band profile received from the radio to facilitate communication to the radio at a first time-of-day on channels other than noisy channels corresponding to the first time-of-day.

* * * * *